United States Patent [19]

Lanham

[11] Patent Number: 4,968,202

[45] Date of Patent: Nov. 6, 1990

[54] DECORATIVE AND PROTECTIVE CAP FOR LOCKNUT

[75] Inventor: Thomas R. Lanham, Eggertsville, N.Y.

[73] Assignee: McGard, Inc., Orchard Park, N.Y.

[21] Appl. No.: 465,343

[22] Filed: Jan. 16, 1990

[51] Int. Cl.⁵ ............................................. F16B 37/14
[52] U.S. Cl. ................................. 411/431; 411/372; 411/377; 411/910
[58] Field of Search ............... 411/429, 430, 431, 372, 411/374, 375, 377, 910; 10/86 C

[56] References Cited

U.S. PATENT DOCUMENTS

| | | | |
|---|---|---|---|
| 1,397,235 | 11/1921 | Sabel | 411/429 |
| 3,485,134 | 12/1969 | Ott | 411/372 |
| 4,659,273 | 4/1987 | Dudley | 411/910 |
| 4,710,082 | 12/1987 | Curtis | 411/429 |
| 4,723,866 | 2/1988 | McCauley | 404/25 |
| 4,824,305 | 4/1989 | McCauley | 411/372 |

FOREIGN PATENT DOCUMENTS 646842 11/1928 France .

Primary Examiner—Neill R. Wilson
Attorney, Agent, or Firm—Joseph P. Gastel

[57] ABSTRACT

A capped nut including a metal nut body, first threads on the outside of the metal nut body, a cap including a metallic shell and a non-metallic insert, dimples in the shell, a shoulder on the insert in contiguous relationship to the dimples for preventing the insert from being removed from the shell, second threads on the insert for mounting on the first threads of the metal nut body, and a rachet arrangement between the insert and the dimples for permitting the shell to override the insert when a turning force is applied to the shell which tends to overtighten the second threads on the insert with the first threads on the nut body but which provides positive engagement between the shell and the insert when a force is applied to the shell for unthreading the cap from the nut body.

23 Claims, 3 Drawing Sheets

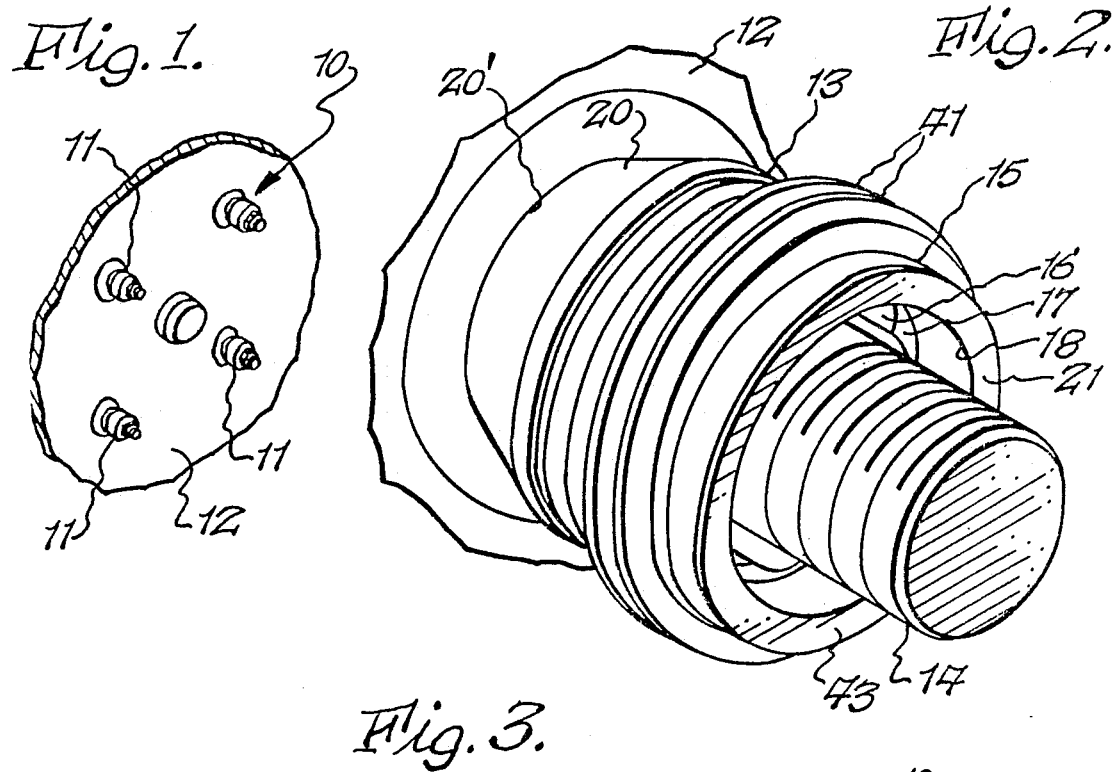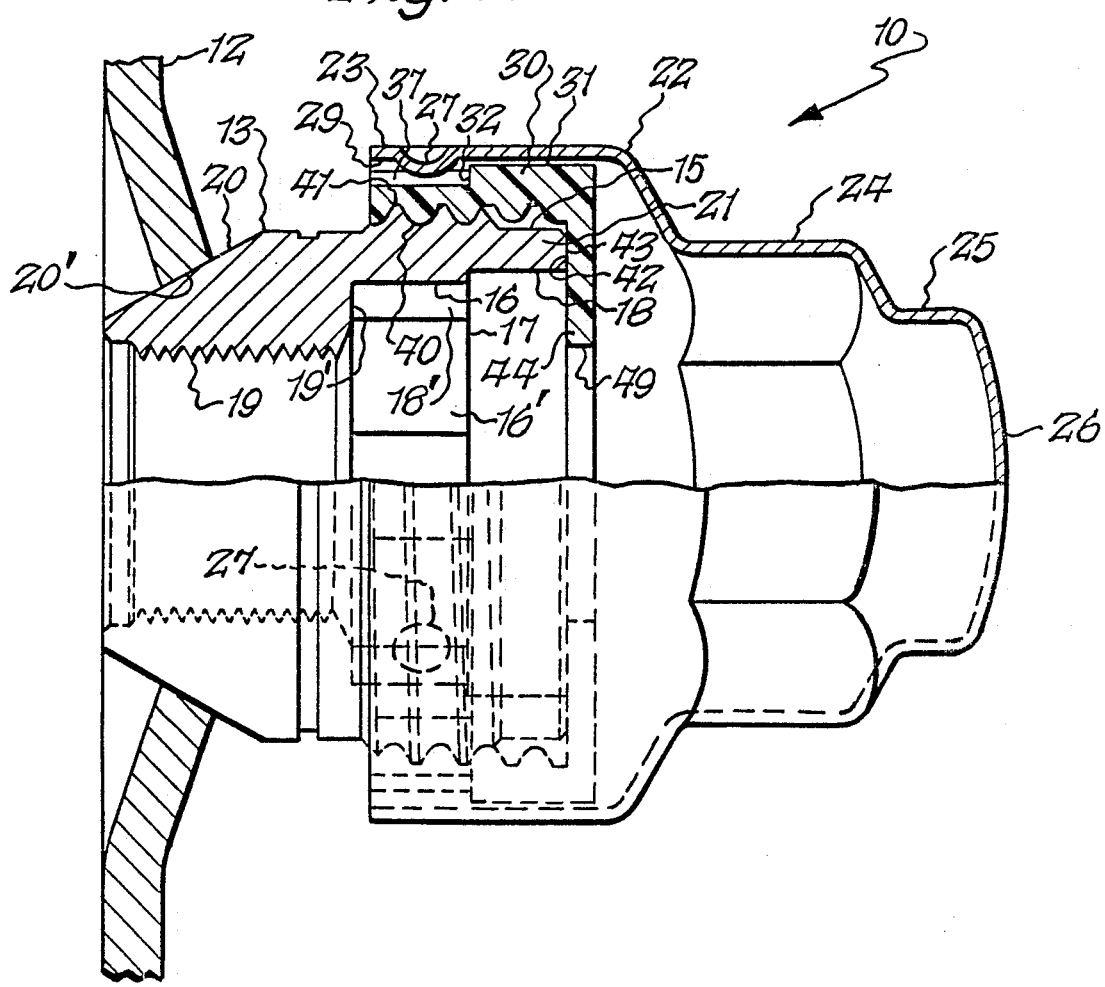

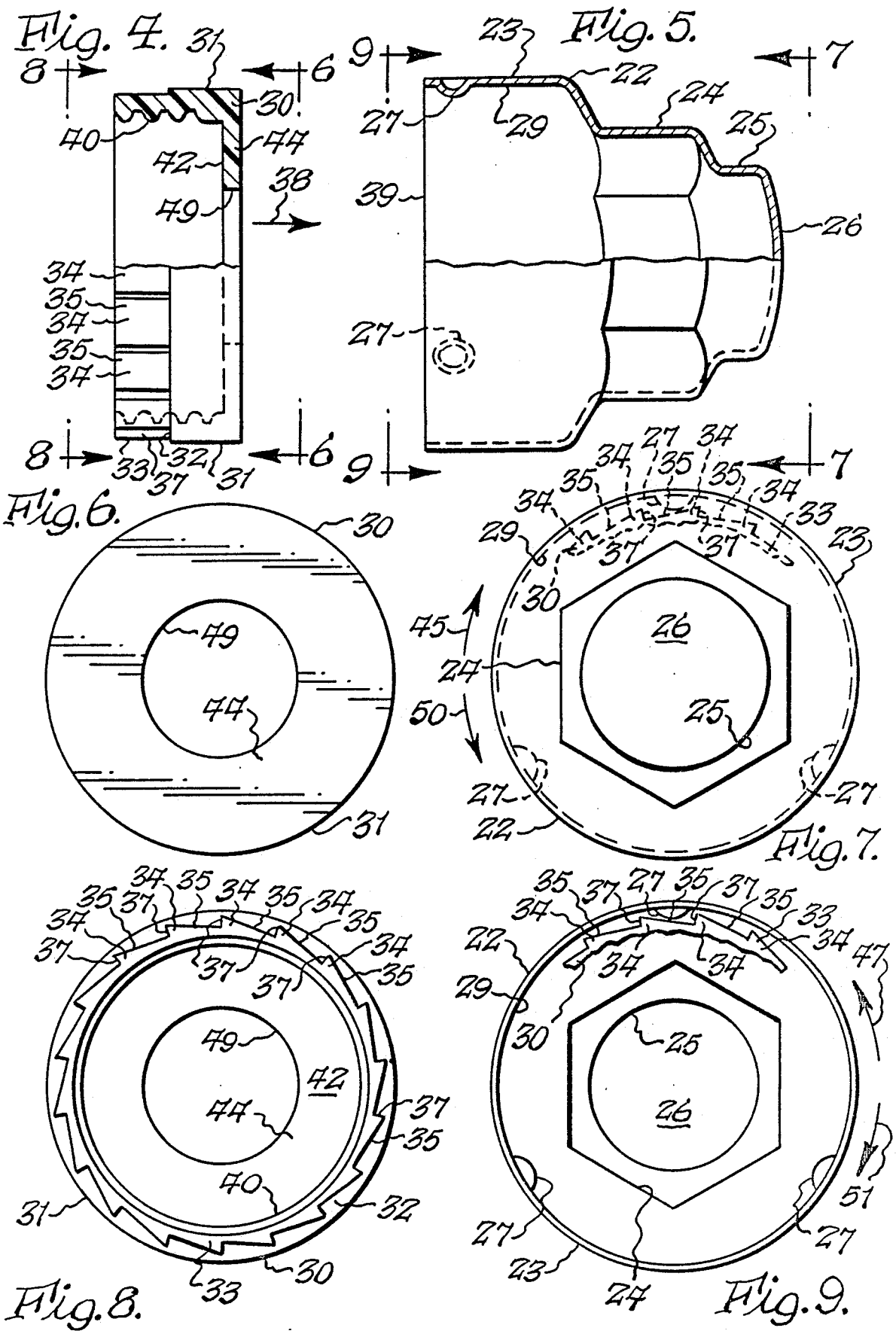

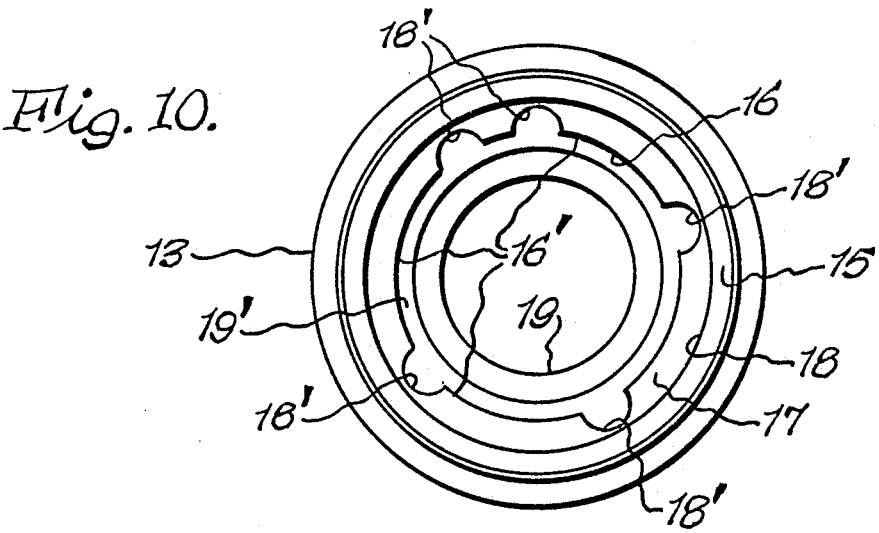
Fig. 10.
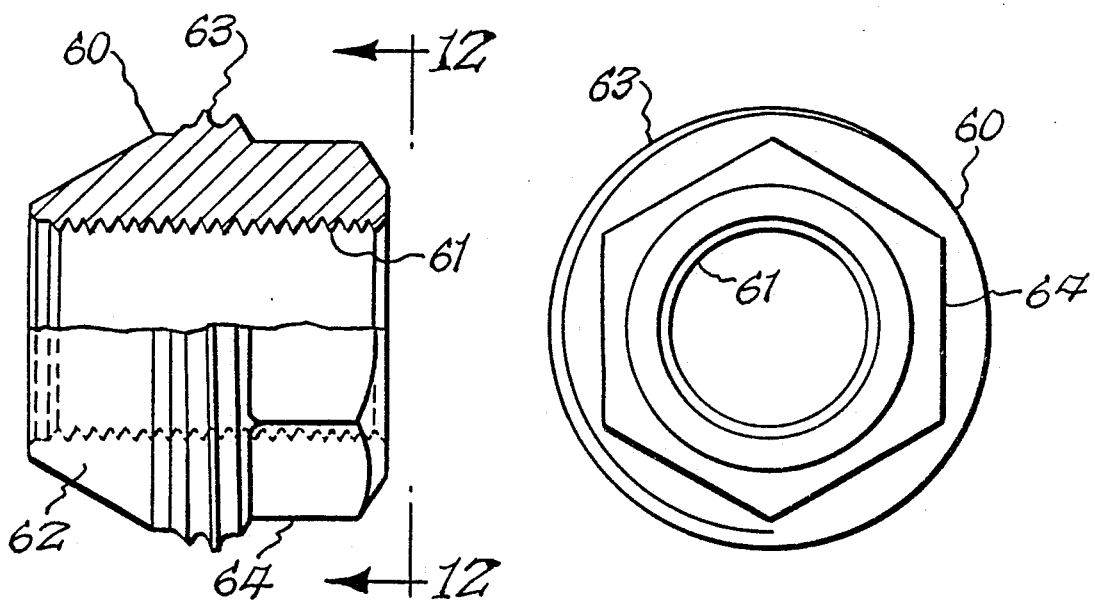
Fig. 11.
Fig. 12.

DECORATIVE AND PROTECTIVE CAP FOR LOCKNUT

BACKGROUND OF THE INVENTION

The present invention relates to a decorative and protective cap for concealing and protecting a nut which is mounted on a stud on which a vehicle wheel rim is mounted.

By way of background, locknuts of the type having a curvilinear groove therein are used to lock a rim to the axle of an automotive vehicle. Locknuts of this type can only be installed properly or removed by the use of a mating key. It is in this manner that the vehicle wheel rim is secured against unauthorized removal.

U.S. Pat. No. 4,824,305 discloses a decorative cap for a locknut which is mounted thereon to cause it to match the remaining exposed nuts on a vehicle rim. The device of this prior patent also conceals the locknut and protects the curvilinear groove therein from the entry of foreign material. The decorative and protective cap of the present invention achieves the foregoing by structure which functions in a different manner and contains certain improvements.

SUMMARY OF THE INVENTION

It is accordingly one object of the present invention to provide a decorative and protective cap for a nut which is used to lock a vehicle rim to a lug against unauthorized removal, the cap containing structure which prevents it from being overtightened when mounted on its associated nut and which permits it to be positively removed from assembled relationship with its associated nut.

Another object of the present invention is to provide an improved decorative and protective cap for a nut wherein there is no metal-to-metal contact between the shell of the cap and the nut, thereby obviating the possibility of corrosion due to galvanic action, considering that the nut and shell are exposed to the elements Other objects and attendant advantages of the present invention will readily be perceived hereafter.

The present invention relates to a capped nut comprising a metal nut body, first and second end portions on said nut body, a seating surface on said first end portion for bearing against a foreign object, first force-receiving means proximate said second end portion for receiving a force-applying member for turning said nut body, a cap including a metallic shell and a non-metallic insert, retaining means for retaining said non-metallic insert within said metallic shell, cooperating means between said nut body and said non-metallic insert for removably mounting said cap on said nut body in covering relationship to said second end portion to thereby conceal said first force-receiving means without contact between said metal nut body and said metallic shell, and second force-receiving means on said cap for receiving a turning force for selectively mounting said cap on said nut body to conceal said first force-receiving means and for demounting said cap from said nut body to expose said first force-receiving means for receiving said force-applying member.

The present invention also relates to a capped nut comprising a nut body, first and second end portions on said nut body, a seating surface on said first end portion for bearing against a foreign object, first force-receiving means proximate said second end portion for receving a force-applying member for turning said nut body, a cap including a shell and an insert, retaining means for retaining said insert within said shell, cooperating means between said nut body and said insert for removably mounting said cap on said nut body in covering relationship to said second end portion to thereby conceal said first force-receiving means, second force-receiving means on said cap for receiving a turning force in a first direction for selectively mounting said cap on said nut body to conceal said first force-receiving means and for receiving a turning force in a second direction demounting said cap from said nut body to expose said first force-receiving means for receiving said force-applying member, and second cooperating means between said shell and said insert for permitting said shell to rotate relative to said insert when said second force-receiving means receive said turning force in said first direction and when said cooperating means are in a locked condition which prevents rotation between said insert and said nut body.

The present invention also relates to a decorative cap for a nut comprising a metal shell, a non-metallic insert, means within said non-metallic insert for mounting said decorative cap on an associated member, retaining means for retaining said non-metallic insert within said metal shell, and cooperating means between said shell and said non-metallic insert for permitting relative rotation in a first direction while preventing relative rotation in a second direction which is opposite to said first direction.

The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view of a vehicle wheel rim mounting a plurality of conventional nuts and a locknut having the decorative and protective cap of the present invention mounted thereon;

FIG. 2 is an enlarged fragmentary perspective view of the locknut mounted on its associated stud which projects through the vehicle rim;

FIG. 3 is an enlarged fragmentary side elevational view partially in cross section showing the decorative and protective cap mounted relative to an associated locknut;

FIG. 4 is a side elevational view partially in cross section of the non-metallic insert of the decorative and protective cap;

FIG. 5 is a side elevational view partially in cross section of the shell of the protective and decorative cap;

FIG. 6 is an end elevational view of the insert taken substantially in the direction of arrows 6—6 of FIG. 4;

FIG. 7 is an end elevational view of the shell taken substantially in the direction of arrows 7—7 of FIG. 5;

FIG. 8 is an end elevational view of the insert taken substantially in the direction of arrows 8—8 of FIG. 4;

FIG. 9 is an end elevational view of the shell taken substantially in the direction of arrows 9—9 of FIG. 5;

FIG. 10 is an end elevational view of the locknut of FIGS. 1—3;

FIG. 11 is a side elevational view, partly in cross section of another type of nut onto which the decorative cap of the present invention can be mounted; and FIG. 12 is a view taken substantially in the direction of arrows 12-12 of FIG. 11.

DESCRIPTION OF THE PREFERRED EMBODIMENTS

The decorative and protective cap 10 of the present invention is intended to be mounted on an associated nut. In FIGS. 1-3 it is shown as being mounted on a locknut to cause it to have an outer appearance like the plurality of nuts 11 which are mounted on rim 12 of an automotive wheel. Decorative cap 10 is intended to protect and conceal locknut 13 which is threadably mounted on stud 14 secured to the axle (not shown) of the vehicle. Cap 10 has an outer appearance which matches the other nuts 11.

Locknut 13 includes a cylindrical body portion 15 which has an axially extending curvilinear recess 16 which extends inwardly from the transverse recessed face 17 at the end of counterbore 18. A thread 19 within locknut 13 threadably mounts it on stud 14. The frustoconical end 20 of locknut 13 bears against a mating depression 20' of rim 12. Curvilinear recess 16, which is a force-receiving structure, is of an irregular configuration for receiving a turning force from a force-applying member, namely, a mating key (not shown) which is used to tighten or loosen it relative to stud 14. Recess 16 has arcuate sides, such as 16', which are interspersed with grooves, such as 18', and recess 16 terminates at shoulder 19'. Grooves 18' receive the lobes of a mating key (not shown). Locknut 13 is fabricated of a suitable carbon steel and it is treated by zinc plating. It has a dichromate coating against corrosion which causes it to have a yellowish color which is different from the silvery color of the other nuts 11.

In accordance with the present invention, decorative and protective cap 10 is intended to threadably fit onto locknut 13 to conceal and protect the end portion 21 at the opposite end from frustoconical surface 20. Furthermore, cap 10 is also intended to combine with the locknut 13 to match the outer appearance of the ordinary nuts 11 in both configuration and color, thereby causing all of the nuts to have a uniform appearance while also causing the wheel to be locked to the axle by means of locknut 13.

The decorative and protective cap 10 includes an outer shell 22 which includes a cylindrical portion 23 which merges into a hexagonal head portion 24 which merges into a smaller cylindrical portion 25 which terminates at a closed curved surface 26. A plurality of dimples 27 are formed integrally with and extend inwardly from the internal surface 29 of cylindrical portion 23. Shell 22 is fabricated from suitable metal, preferably stainless steel.

A molded plastic insert 30, which may be nylon or any other suitable plastic, fits within shell 22. In this respect, insert 30 includes a cylindrical end portion 31 which is slightly smaller than the internal diameter of portion 23 of shell 22. There may be a clearance of between about .005 and .010 inches therebetween to permit relative rotation between the insert and shell without binding. Cylindrical portion 31 terminates at a shoulder 32. A saw tooth portion 33 extends away from shoulder 32. The saw tooth portion 33 defines an entire circumference of the end portion of insert 30 and it consists of contiguous adjacent saw teeth 34 which define the periphery of saw tooth portion 33. Each saw tooth has a sloping side 35 and an abrupt side 37.

Insert 30 is installed permanently within shell 22. In this respect it is moved axially in the direction of arrow 38 in FIG. 4 into the open end 39 of shell 22. The outer diameter of cylindrical portion 31 of insert 30 is larger than the inner diameter of a circle which is tangent to the innermost portions of dimples 27. However, insert 30 is flexible so that its cylindrical portion 31 will yield to permit it to pass dimples 27, and after its shoulder 32 passes the dimples, cylindrical portion 31 will snap back to its original shape whereupon dimples 27 will be in a position to abut shoulder 32 and thus the insert will be retained within shell 22, if any forces are applied which tend to remove insert 30 from the shell.

In operation, the assembly of shell 22 and insert 30 are mounted on the outer periphery of locknut 13. In this respect, the internal surface of insert 30 has a thread 40 which matches the thread 41 on the external surface of locknut 13. Thus, the insert 30, with shell 22 permanently assembled thereon, can be screwed onto locknut 13.

The limit of axial movement of insert 30 on locknut 13 occurs when surface 42 of the insert abuts end 43 of the locknut. When this occurs, the annular end portion 44 on which surface 42 is located binds with end 43 of the locknut. This binding occurs because annular portion 44 has a degree of flexibility and resilience so that it will deflect slightly outwardly in the direction away from locknut end 43 when a turning force continues to be applied to insert 30. The resilience of annular portion 44 will thus cause the insert to have a binding action with the locknut body which tends to prevent it from becoming unthreaded as a result of the vibrations to which it is subjected in use.

During the process of mounting the decorative cap 10 onto stud 13, it is rotated in the direction of arrow 45 in FIG. 7 which is the equivalent of the direction 47 in FIG. 9. The turning force is effected by applying a force-applying member, namely, a wrench to the hexagonal portion 24 of the shell, which is a force-receiving member. As can be seen from FIG. 7, when the turning force is applied in the direction of arrow 45, the dimples 27 will abut the inclined surfaces 35 of the insert and cause it to rotate with the shell 22. Such joint rotation of the shell 22 and insert 30 will continue until the foregoing condition is reached wherein inner annular surface 42 abuts the end 43 of the locknut 13. Continued tightening rotation applied to shell 22 in the direction of arrow 45 will cause the dimples 27 to ride over the inclined surfaces 35, and thus there can be relative rotary motion therebetween which prevents breakage of the insert. At this point it is to be noted that there is a circular opening 49 within annular portion 44. This opening is sufficiently large to permit the stud 14 to project therethrough in the event it is of a length which passes beyond annular wall 44 during mounting.

When it is desired to remove decorative cap 10 from locknut 13, as is necessary when it is desired to expose the curvilinear recess for receiving a key, the decorative cap 10 is rotated in the direction of arrow 50 of FIG. 7 which is equivalent to arrow 51 of FIG. 9. The dimples 27 will then move to engage the abrupt portions 37 of the adjacent saw teeth and thus transmit a turning force to insert 30 to rotate it in an unthreading direction. Thus, the saw tooth configuration permits the decorative cap 10 to be mounted on an associated locknut without overtightening by permitting relative rotation between the shell 22 and insert 30 while providing a positive engagement therebetween when the decorative cap is turned in an unthreading direction.

While the foregoing description was directed to a specific type of locknut, it will be appreciated that the decorative cap of the present invention is also intended to be used with nuts of other types having different shapes and which are made from materials which should be covered for decorative purposes and relative to which there should be no metal-to-metal contact to avoid corrosive galvanic action. A nut of the foregoing type is shown in FIGS. 11 and 12.

Nut 60 is one type of nut to which the preceding paragraph refers. Nut 60 is a type of lug nut which is fabricated of a suitable carbon steel and which has an internal thread 61 for mounting it on a stud, such as 14. It also has a frustoconical nose 62 which functions in the same manner as nose 20 of nut 13. It also has a hexagonal head 64 for receiving a wrench for mounting it on stud 14. A thread 63 is located on the central portion of the nut body.

The major difference between nut 13 of FIGS. 1–3 and that of FIGS. 11–12 is that the former is mounted and demounted by means of a force-applying member in the nature of a key whereas the latter is mounted and demounted by means of a force-applying member in the nature of a wrench applied to hexagonal head 64.

A decorative and protective cap 10 of the type disclosed in FIGS. 1–9 is intended to be used with nut 60 to cover the hexagonal head end thereof, and thus conceal the stud on which it is mounted and also cause it to provide a decorative appearance. In the latter respect, nut 60, as noted above, is fabricated of a suitable suitable carbon steel which may have a suitable coating, such as zinc coated with dichromate, which gives it a yellow color. The cap 10, which is fabricated of stainless steel, has a desirable silver color appearance. Furthermore, the plastic insert 30 prevents contact between the dissimilar metals of the shell 22 and nut 60, thereby preventing corrosive galvanic action.

Another advantage of the present construction over prior types having the cap in metal-to-metal contact with the nut of a different metal is that the present construction is not subject to galvanic corrosion which in turn lessens the bond between the shell and the nut and may lead to the fracture between the shell and the nut when a wrench is applied.

While preferred embodiments of the present invention have been disclosed, it will be appreciated that it is not limited thereto but may be otherwise embodied within the scope of the following claims.

What is claimed is:

1. A capped nut comprising a metal nut body, first and second end portions on said nut body, a seating surface on said first end portion for bearing against a foreign object, first force-receiving means proximate said second end portion for receiving a force-applying member for turning said nut body, a cap including a metallic shell and a non-metallic insert, retaining means for retaining said non-metallic insert within said metallic shell, first cooperating means between said nut body and said non-metallic insert for removably mounting said cap on said nut body in covering relationship to said second end portion to thereby conceal said first force-receiving means without contact between said metal nut body and said metallic shell, second force-receiving means on said cap for receiving a turning force for selectively mounting said cap on said nut body to conceal said first force-receiving means and for demounting said cap from said nut body to expose said first force-receiving means for receiving said force-applying member, and second cooperating means between said non-metallic insert and said metallic shell for permitting said metallic shell to rotate relative to said non-metallic insert when said second force-receiving means receive a force tending to rotate said cap in a direction for mounting said cap on said metal nut body and when said cooperating means are in a locked condition which prevents rotation between said non-metallic insert and said metal nut body.

2. A capped nut as set forth in claim 1 wherein said second cooperating means include means for effecting a locking engagement between said non-metallic insert and said metallic shell when said second force-receiving means receive a force tending to rotate said cap in a direction for demounting said cap from said nut body.

3. A capped nut as set forth in claim 2 wherein said second cooperating means comprise ratchet means between said shell and said non-metallic insert.

4. A capped nut as set forth in claim 3 wherein said ratchet means comprise inwardly extending dimples on said shell, and a toothed periphery on said non-metallic insert.

5. A capped nut as set forth in claim 4 wherein said retaining means comprise a shoulder on said non-metallic insert for bearing against said dimples in the event said non-metallic insert is moved in an axial direction away from said shell.

6. A capped nut as set forth in claim 5 wherein said first cooperating means comprise mating threads between said metal nut body and said non-metallic insert.

7. A capped nut as set forth in claim 6 including an internally threaded portion on said metal nut body for receiving a threaded stud, and an opening in said non-metallic insert in axial alignment with said internally threaded portion for permitting said threaded stud to pass therethrough.

8. A decorative cap for a nut comprising a metal shell, a non-metallic insert, means within said non-metallic insert for mounting said decorative cap on an associated member, retaining means for retaining said non-metallic insert within said metal shell, cooperating means between said shell and said non-metallic insert for permitting relative rotation in a first direction while preventing relative rotation in a second direction which is opposite to said first direction, said cooperating means comprising ratchet means between said shell and said non-metallic insert, and said ratchet means comprising inwardly extending projections on said shell, and ratchet teeth on said non-metallic insert.

9. A decorative cap for a nut as set forth in claim 8 wherein said retaining means comprise a shoulder on said non-metallic insert for abutting said inwardly extending projections.

10. A decorative cap for a nut as set forth in claim 8 wherein said inwardly extending projections comprise dimples.

11. A decorative cap for a nut as set forth in claim 10 wherein said retaining means comprise a shoulder on said non-metallic insert for abutting said dimples.

12. A decorative cap for a nut comprising a metal shell, a non-metallic insert, means within said non-metallic insert for mounting said decorative cap on an associated member, retaining means for retaining said non-metallic insert within said metal shell, cooperating means between said shell and said non-metallic insert for permitting relative rotation in a first direction while preventing relative rotation in a second direction which is opposite to said first direction, said retaining means comprising inwardly extending projections on said shell, and a shoulder on said non-metallic insert.

13. A decorative cap for a nut as set forth in claim 12 wherein said inwardly extending projections comprise dimples.

14. A decorative cap for a nut comprising a metal shell, a non-metallic insert, means within said non-metallic insert for mounting said decorative cap on an associated member, retaining means for positively locking said said non-metallic insert against removal form said metal shell, and cooperating means between said shell and said non-metallic insert for permitting relative rotation in a first direction while preventing relative rotation in a second direction which is opposite to said first direction and while said retaining means prevent separation of said metal shell from said non-metallic insert in all relative rotational positions of said non-metallic insert and said metal shell.

15. A decorative cap for a nut as set forth in claim 14 wherein said cooperating means comprise ratchet means between said shell and said non-metallic insert.

16. A capped nut comprising a nut body, first and second end portions on said nut body, a seating surface on said first end portion for bearing against a foreign object, first force-receiving means proximate said second end portion for receving a force-applying member for turning said nut body, a cap including a shell and an insert, retaining means for retaining said insert within said shell, first cooperating means between said nut body and said insert for removably mounting said cap on said nut body in covering relationship to said second end portion to thereby conceal said first force-receiving means, second force-receiving means on said cap for receiving a turning force in a first direction for selectively mounting said cap on said nut body to conceal said first force-receiving means and for receiving a turning force in a second direction demounting said cap from said nut body to expose said first force-receiving means for receiving said force-applying member, and second cooperating means between said shell and said insert for permitting said shell to rotate relative to said insert when said second force-receiving means receive said turning force in said first direction and when said first cooperating means are in a locked condition which prevents rotation between said insert and said nut body.

17. A capped nut as set forth in claim 16 wherein said second cooperating means include means for effecting a locking engagement between said insert and said shell when said second force-receiving means receive said turning force in said second direction for demounting said cap from said nut body.

18. A capped nut as set forth in claim 17 wherein said second cooperating means comprise ratchet means between said shell and said insert.

19. A capped nut as set forth in claim 18 wherein said ratchet means comprise inwardly extending dimples on said shell, and a toothed periphery on said insert.

20. A capped nut as set forth in claim 19 wherein said retaining means comprise a shoulder on said non-metallic insert for bearing against said dimples in the event said non-metallic insert is moved in an axial direction away from said shell.

21. A capped nut as set forth in claim 20 wherein said first cooperating means comprise mating threads between said nut body and said insert.

22. A capped nut as set forth in claim 21 including an internally threaded portion on said nut body for receiving a threaded stud, and an opening in said insert in axial alignment with said internally threaded portion for permitting said threaded stud to pass therethrough.

23. A capped nut comprising a nut body, first and second end portions on said nut body, a seating surface on said first end portion for bearing against a foreign object, first force-receiving means proximate said second end portion for receiving a force-applying member for turning said nut body, a cap including a shell, first cooperating means between said nut body and said shell for removably rotatably mounting said cap on said nut body in covering relationship to said second end portion to conceal said first force-receiving means, second force-receiving means on said cap for receiving a turning force in a first direction for selectively mounting said cap on said nut body and for receiving a turning force in a second direction for demounting said cap from said nut body, and second cooperating means between said shell and said nut body for permitting said shell to rotate relative to said nut body when said second force-receiving means receive said force in said first direction and when said first cooperating means are in a locked condition which tends to prevent further rotation between said shell and said nut body.

* * * * *